April 27, 1926.    1,582,765
J. O. LINDSEY
SHOCK ABSORBER
Filed March 21, 1925    2 Sheets-Sheet 1

INVENTOR.
James O. Lindsey,
BY
Geo. P. Kimmel, ATTORNEY.

April 27, 1926.

J. O. LINDSEY

SHOCK ABSORBER

Filed March 21, 1925   2 Sheets-Sheet 2

1,582,765

INVENTOR.
James O. Lindsey,
BY
ATTORNEY.

Patented Apr. 27, 1926.

1,582,765

UNITED STATES PATENT OFFICE.

JAMES OWEN LINDSEY, OF COMANCHE, TEXAS.

SHOCK ABSORBER.

Application filed March 21, 1925. Serial No. 17,353.

*To all whom it may concern:*

Be it known that I, JAMES OWEN LINDSEY, a citizen of the United States, residing at Comanche, in the county of Comanche and State of Texas, have invented certain new and useful Improvements in Shock Absorbers, of which the following is a specification.

This invention relates to shock absorber attachments to vehicles, more particularly to devices of this character adapted to be attached to motor driven vehicles, and has for one of its objects to simplify the construction and increase the efficiency and utility of devices of this character.

Another object of the invention is to provide a device of this character which may be applied without material structural change to different makes of vehicles.

With these and other objects in view, the invention consists in certain novel features of construction as hereinafter shown and described and then specifically pointed out in the claims, and in the drawings illustrative of the preferred embodiment of the invention, Figure 1 is a side elevation, and—

The improved device includes securing devices of novel construction adapted to be coupled to the opposite sides of the body adjacent and to the forward axle, and to the rear axle or the springs or other portions adjacent thereto, and compression springs connected by novel means to the securing devices.

Figure 1:
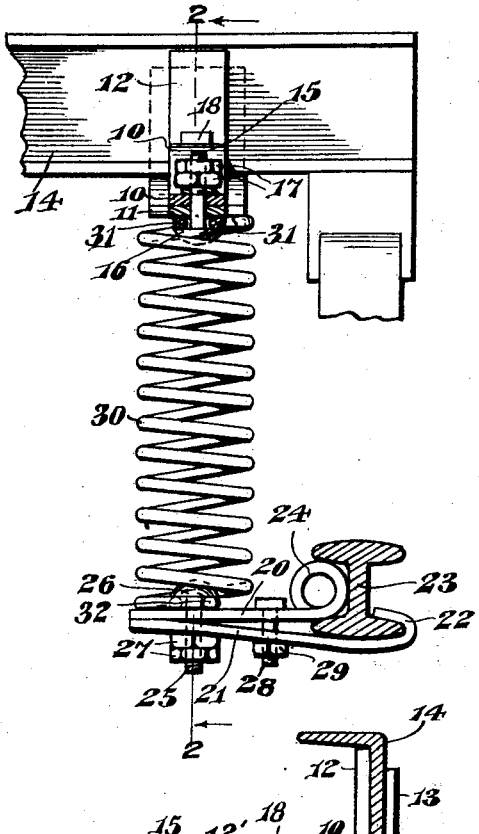
Figure 2:
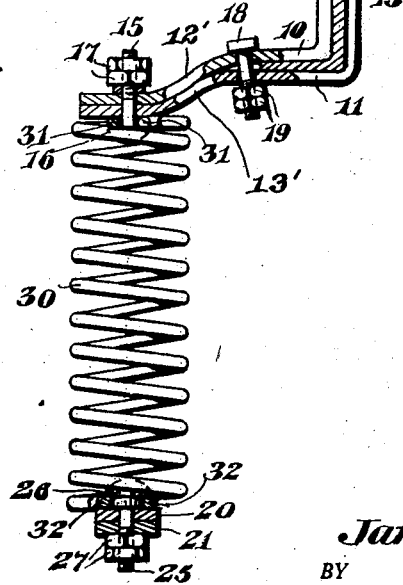
Figure 2 is a rear elevation, partly in section, of the improved device applied to the rear axle of a motor driven vehicle.
Figure 3:
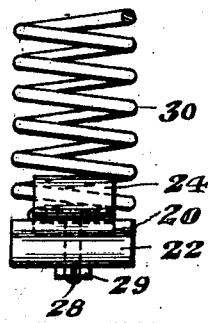
Figure 3 is a detail of the lower portion of Figure 1 at right angles thereto.
Figure 4:
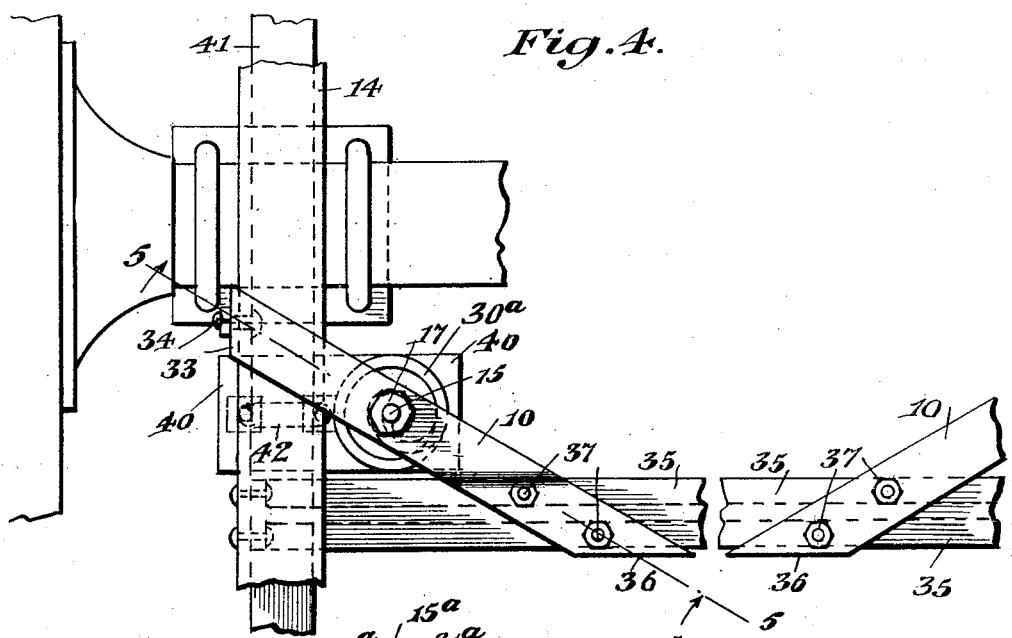
Figure 4 is a plan view of the improved device as applied to the rear axle.
Figure 5:
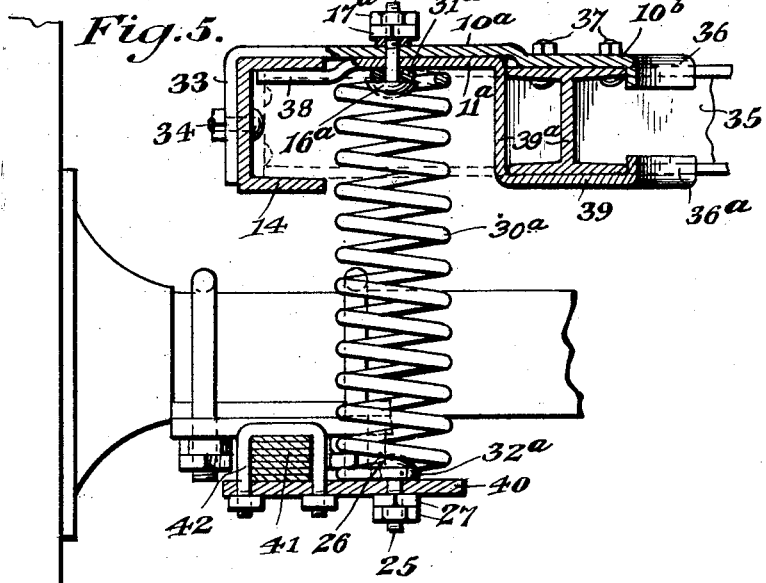
Figure 5 is a section on the line 5—5 of Figure 4.

In Figures 1, 2 and 3 the improved device is shown applied to a portion of a conventional supporting frame and the forward axle, and in Figures 4 and 5 the improved device is shown associated with the supporting frame and the rear axle, of a motor driven vehicle.

The structure disclosed in Figures 1, 2 and 3 is primarily for use upon the forward part of a vehicle and this structure comprises a pair of superposed clamping elements 10 and 11, each of which elements has one end upturned as indicated by the numerals 12 and 13. The other portions 12' and 13' of the superposed clamping elements are of materially greater length than the portions 12 and 13 and the inner end of each portion is formed at right angles with respect to the attached portions 12 and 13 while the outer end thereof curves downwardly and outwardly as shown. Each of the portions 12 and 13 has a pair of apertures therethrough which when the members are placed one above the other come into alignment.

The members 10 and 11 are adapted to clamp a portion of the machine frame such as the channel bar 14 which forms the side of the machine structure and when the members are so attached to the frame bolt members 15 and 18 are passed through the apertures in the members as shown in Figure 2 and the securing nuts 17 and 19 placed upon their respective bolts and drawn up to bring the members 10 and 11 together for clamping engagement about the frame 14.

A pair of lower superposed clamping members indicated generally by the numerals 20 and 21 respectively is provided to engage the front axle of the vehicle and the lower one of these members, the member 21, is relatively long as shown in Figure 1 and has one end thereof turned back upon itself to provide the hook 22 which is designed as shown to engage over the lower flange of the axle 23. The member 20 is of materially less length than the member 21 and has its inner end rolled as indicated by the numeral 24 and is designed to position in the inner channel of the axle.

These members 20 and 21 are also provided with a pair of apertures each and when in position these apertures fall in alignment and there is passed through the aligned apertures the bolts 25 and 28, each of which is provided with clamping nuts 27 and 29 respectively, which nuts when applied to the bolts draw the members 20 and 21 together to clamp the same in position upon the axle 23.

When the upper members 11 are in position they extend inwardly from the chassis frame 14, beneath the machine to which they are attached and the members 20 and 21 when in place upon the axle extend rearwardly from the axle so that the end portions of the upper and lower members fall in spaced superposed position. When thus positioned a spring 30 is arranged therebetween and the upper end of this spring, which terminates in the centrally positioned eye 31 has the upper bolt 15 passed therethrough and the head 16 of the bolt 15 bears against the underside of this eye. The lower end of the spring is provided with a like eye 32 which is arranged upon the longitudinal center of the spring, and the bolt 25 is passed through this eye and the head 26 of the bolt 25 bears against the eye and holds the same tightly against the top of the lower member 20.

It will be clear from the foregoing description that the helical spring 30 if positioned as described and held between the chassis frame and the axle as shown will act efficiently to absorb rebound shocks and prevent the breakage of the springs of the machine.

In Figures 4 and 5 slight modifications of the clamp structure as above described are shown for retaining the spring between the rear axle or lower running gear of the machine and the chassis of the machine.

The shock absorbing spring designed to be used beneath the rear of the machine is shown at $30^a$ and as shown the upper and lower ends of this spring are turned inwardly and terminate in eyes $31^a$ and $32^a$ respectively in the same manner as the spring 30. Arranged across the corner formed between the joined side beam 14 and transverse beam 35 of the chassis frame, is a pair of superposed clamp plates indicated generally by the numerals $10^a$ and $11^a$ respectively. These clamp plates are arranged in superposed relation as shown and the upper plate $10^a$ has a parallel slightly offset portion $10^b$ which terminates in the downturned edge 36. The other end of the member $10^a$ is turned at right angles to provide the right angled extension 33. As shown the offset portion $10^b$ is designed to rest upon the top of the transverse member 35 with the downturned end overhanging the outer side of the member and the angled portion 33 is designed to be arranged against the outerside of the chassis side frame 14. As is clearly shown in Figure 4 the downturned portion 33 and the offset portion 35 as well as the downturned end 36 of the offset portion is bent at an angle across the bar and not straight across as is the case with the clamp members 10 and 11. This method of bending allows the clamp member to snugly fit across the corner of the chassis frame beam as described.

The member $11^a$ which is arranged beneath the member $10^a$ has the outer end thereof slightly offset and in parallel relation thereto as indicated by the numeral 38 and the inner end is also offset as indicated by the numeral 39 and this offset portion has the end edge thereof upturned as indicated at $36^a$. A right angled portion $39^a$ connects the offset portion 39 with the main body of the under member. The offset portion 39 of this member is designed as shown to bear against the underside of the transverse chassis member 35 and the right angled portion $39^a$ of the body portion to bear against the underside of the main body portion of the plate $10^a$, while the outer offset end 38 is arranged beneath and bears against the underside of the top flange of the side beam of the chassis frame.

Securing bolts 37 are passed through the flanges of the cross beam 35 and through the offset portion $10^b$ of the upper member $10^a$ and a securing bolt is also passed through the downturned portion 33 of the upper member as indicated at 34.

Each of the members $10^a$ and $11^a$ has an aperture formed through the main body portion and these apertures when aligned have passed therethrough the securing bolts $15^a$, the bolts having been passed through the eye $31^a$ at the upper end of the spring and when the head $16^a$ is drawn against the underside of the eye to secure the spring to the underside of the member $11^a$, the securing nuts $17^a$ are threaded thereon and the spring is made fast to the upper clamp members.

The lower eye $32^a$ of the spring has passed therethrough a bolt 25 having a head 26 which bears against the eye and this bolt is passed through a flat plate member 40 and has threaded thereon the nuts 27 which secure the eye against the upperside of the plate member 40. The outer end of the plate member is provided with a pair of apertures through which the legs of the U bolt 42 are extended, after the U bolt has been arranged over a spring 41 and when securing nuts are placed upon the legs of the U bolt the same and the plate 40 is secured to the underside of the same.

The improved device is simple in construction, strong and durable, and operates effectually to absorb the jars and concussions incident to the travelling over rough or uneven roads, and prevents such jars being transmitted to the running gear or body of the vehicle.

The preferred embodiment of the invention is disclosed in the drawings and set forth in the specification but it will be understood that modifications within the scope of the claimed invention may be made in the construction without departing from the principle of the invention or sacrificing any of its advantages.

Having thus described my invention what I claim is:

1. A shock absorber for vehicles including a chassis having side and connecting end cross beams and a supporting spring, comprising a clamp element arranged across the corner formed between the connected side and end beams, a spring connected to said element intermediate the ends and depending from the underside thereof, and a plate member secured to and extending inwardly from said supporting spring and having the lower end of said depending spring secured thereto.

2. A shock absorber for vehicles including a chassis having side and connecting end cross beams and a supporting spring, comprising a clamp element formed of an upper and lower plate body adapted to extend across the corner formed between the connected side and end beams and having their ends formed to engage said beams therebetween, a supporting plate, means for securing the same beneath said element to said spring, and a helical spring arranged between said element and said plate and having the ends secured thereto.

In testimony whereof, I affix my signature hereto.

JAMES OWEN LINDSEY.